United States Patent [19]

Herzog

[11] 3,928,393
[45] Dec. 23, 1975

[54] PROCESS FOR THE PREPARATION OF OXIRANE COMPOUNDS

[75] Inventor: Stanley Herzog, Tenafly, N.J.

[73] Assignee: Halcon International, Inc., New York, N.Y.

[22] Filed: Apr. 9, 1969

[21] Appl. No.: 814,693

[52] U.S. Cl. ............... 260/348.5 L; 260/610 A
[51] Int. Cl. .................... C07d 1/12; C07d 1/08
[58] Field of Search .............. 260/610 A, 348.5 LL

[56] References Cited
UNITED STATES PATENTS

| 2,347,434 | 4/1944 | Reichert et al. | 260/502 |
| 2,527,640 | 10/1950 | Lorand et al. | 260/610 |
| 3,351,635 | 11/1967 | Kollar | 260/348.5 |
| 3,445,523 | 5/1969 | Rosenthal et al. | 260/610 |

FOREIGN PATENTS OR APPLICATIONS

| 234,163 | 5/1925 | United Kingdom | 260/610 |
| 692,876 | 8/1964 | Canada | 260/610 |

Primary Examiner—Norma S. Milestone

[57] ABSTRACT

This invention relates to an improvement in the process for the preparation of an oxirane compound by a process comprising the steps of (a) oxidation of a hydrocarbon to produce an organic hydroperoxide and (b) reacting the hydroperoxide with an olefinically unsaturated compound to produce the oxirane compound. The improvement with which this invention is concerned resides in the use of citric acid to minimize iron-catalyzed decomposition of the organic hydroperoxide without adversely affecting the reaction between the hydroperoxide and the olefinically unsaturated compound.

10 Claims, 3 Drawing Figures

HYDROCARBON AUTOXIDATION

HYDROCARBON AUTOXIDATION

FIG. 1

MOLAR RATIO, MOLES CITRIC/MOLE FE

HYDROPEROXIDE DECOMPOSITION RATE VS. AMOUNT OF CITRIC ACID AS MOLAR RATIO, MOLES CITRIC/MOLE FE

PROCESS FOR THE PREPARATION OF OXIRANE COMPOUNDS

BACKGROUND OF THE INVENTION

Processes for the producing of oxtrane compounds by the liquid phase reaction between an olefinically unsaturated compound and an organic hydroperoxide have recently become available for commercial exploitation (see U.S. pat. Nos. 3,351,635 and 3,350,422). The process of these recently issued patents requires the use of a molybdenum, tungsten, titanium, columbium, tantalum, rhenium, selenium, chromium, zirconium, tellurium, uranium, or vanadium catalyst.

Since the production of oxtrane compounds by such a process requires the use of large quantities of organic hydroperoxides as reactants, these hydroperoxides are advantageously produced by the molecular oxygen oxidation of a hydrocarbon corresponding in carbon structure to the desired hydroperoxide in the presence of a liquid phase reaction medium. For convenience, this procedure often will be hereinafter referred to as an "autoxidation." Such autoxidation techniques readily permit production of organic hydroperoxides in the quantities sufficient for commercial production of oxirane compounds by the foregoing method. Hydrocarbon autoxidation processes for the production of organic hydroperoxides are also generally known; see, for example, U.S. pat. Nos. 2,843,633 and 2,845,461 as illustrations of such processes.

Accordingly, the commercial production of oxirane comopounds employing organic hydroperoxides fundamentally involves the steps of autoxidation of a hydrocarbon to produce the corresponding organic hydroperoxide and the reaction of the organic hydroperoxide so produced with the olefinically unsaturated compound to be epoxidized. The latter of the two above-recited steps will hereinafter be referred to as the "epoxidation" step. Other steps can be and often are employed. For example, the effluent from the autoxidation comprises, in addition to the hydroperoxide, unreacted hydrocarbon and alcohol formed in part by hydroperoxide decomposition as well as ketones, acids, and other oxidation products. The effluent is advantageously processed for at least partial removal of unreacted hydrocarbon and, possibly, for removal of some or all of the alcohol prior to introducing the hydroperoxide to the epoxidation.

Clearly, the economic attractiveness of such a processed in large measure is dependent upon the most efficient production and utilization of hydroperoxide. Hydroperoxides, however, are relatively unstable materials which readily decompose at elevated temperatures. Moreover, hydroperoxide decomposition is catalyzed by such metal ions as cobalt, manganese, iron and nickel; hence, it is desirable to exclude such metal ions from systems wherein hydroperoxides are present. In the case of cobalt, manganese and nickel, for example, such exclusion is readily effected. However, in the case of iron, the problems are much more difficult since the use of iron-containing materials of construction is fundamentally unavoidable without subjecting the overall process to undesirable economic consequences. Accordingly, techniques have been developed for passivating iron-containing metal surfaces to avoid introductin of iron ion to hydroperoxide-containing systems. While such techniques are effective for their intended purpose, they are expensive and cumbersome to employ in commercial practice and the passivating agents used can interfere with the use of the hydroperoxide products in subsequent epoxidation. One commonly used technique suffering precisely from these drawbacks involves nitric acid cleaning of equipment, washing the equipment with distilled water followed by treatment of the equipment with an aqueous sodium pyrophosphate solution. Additionally, no matter how effective passivation techniques may be, they have no effect upon iron contamination introduced with feedstocks in the form of entrained rust or scale. The presence of even minute quantities of such contaminants in reaction feeds essentially defeats the entire purpose of the complex passivation techniques outlined above.

Safety considerations are also involved. Iron-catalyzed hydroperoxide decomposition results in the conversion of the organic hydroperoxide to alcohol and the liberation of molecular oxygen. This oxygen can accumulate within equipment and eventually can result in the formation of inflammable or even, possibly, explosive mixtures. This problem becomes of greatest significance in equipment such as storage tanks and intermediate distillation, if any, between the autoxidation and epoxidation steps.

Accordingly, there is a need for a technique to prevent metallic contaminants, especially iron, from catalyzing hydroperoxide decomposition. Such a method, of course, must not interfere with utilization of the hydroperoxide in subsequent epoxidation. Such a method is provided by the process of this invention.

SUMMARY OF THE INVENTION

In accordance with this invention, it has been found that the foregoing advantages are achieved by incorporating citric acid with the organic hydroperoxide. The citric acid can be incorporated substantially at any point in the process sequence. For example, citric acid can be added to the feed to the hydrocarbon autoxidation wherein the hydrocarbon is converted to the organic hydroperoxide. The citric acid also can be added after the autoxidation but before any optional distillation wherein unreacted hydrocarbon is removed. Furthermore, the citric acid can be added prior to or during the epoxidation. As an obvious alternative, the citric acid can be added at several points in the overall combination of processing steps outlined hereinabove.

The behavior of citric acid in this process, as will be hereinafter more fully disclosed, acts to inactivate soluble iron as a hydroperoxide decomposition catalyst. This is all the more surprising since a side effect of citric acid appears to be to cause an increase in the solubility or iron in the system. For example, while iron as such or in the form of its oxide is substantially insoluble in hydrocarbons, its solubility increases as the quantity of oxygenated materials present increases. Thus, an autoxidation product containing about 50% of hydroperoxide and about 50% of alcohol when refluxed for 12 hours in contact with ferric oxide contains at the end of this time as much as 0.5 parts per million by weight (hereinafter abbreviated as "p.p.m.") of soluble iron. When the experiment is repeated in the presence of citric acid as well as ferric oxide, iron solubility can be as high as 1.5 p.p.m. or higher. Nominally, therefore, one would expect citric acid to detrimentally affect one or more of the steps of the overall process; whereas, precisely the opposite effect is observed. Autoxidation performance is enhanced and epoxidation performance remains substantially at the levels observed when no iron or citric acid are present.

DETAILED DESCRIPTION OF THE INVENTION

The autoxidation, epoxidation and other optional intermediate steps with which this invention is concerned are each disclosed in the prior art although they are hereinafter discussed to ensure completeness.

The citric acid is employed, in accordance with this invention; to suppress iron-catalyzed hydroperoxide decomposition without adversely affecting the epoxidation reaction. The citric acid is preferably used as such, i.e., not in the form of its salts; since the salts of citric acid have been found to be much less effective and, were such salts used, substantially greater amounts would be required.

The citric acid can be added as such, i.e., in the form of the solid (anhydrous or hydrate) or it can be added in the form of a solution. For ease of handling and to promote rapid and uniform distribution, the use of solutions is normally preferred. The preferred solvents for the citric acid are one or more of the materials indigenous to the system wherein the solution is to be used. For example, in systems employing t-butyl or t-amyl hydroperoxides, the solvents of choice would comprise t-butanol or t-amyl alcohol respectively while, in systems employing alpha-phenylethyl hydroperoxide, the preferred solvent would comprise alpha-phenylethanol. In addition to the alcohol, the solvent can also contain the corresponding hydroperoxide and the corresponding hydrocarbon. Indeed, a preferred solvent corresponds in composition to the hydroperoxide-containing oxidate by autoxidation which, in addition to hydroperoxide, does contain hydrocarbon and alcohol as well as small amounts of acidic by-products. The use of aqueous citric acid solutions is also possible but normally preferred.

The amount of citric acid employed in accordance with this invention would normally depend on the amount of soluble iron to be expected in the system which, in turn, would depend upon the forms of iron to which the system has been or is to be exposed. Where the only forms to be expected are metallic iron (in the form of steel, stainless steel or like materials of construction) or iron oxides (in the form of rust, scale, etc.), the amount of soluble iron would be small — of the order of 10 ppm or less. On the other hand, when relatively soluble forms of iron are present (e.g., iron salts such as iron naphthenate), significantly larger amounts of soluble iron can be present. Generally speaking, the use of any amount of citric acid to suppress iron catalyzed hydroperoxide decomposition will show some benefit. Normally, the amount of citric acid employed should be sufficient to supply a molar ratio of citric acid to soluble iron of at least about 0.2:1. It is desired to employ an amount of citric acid sufficient to supply a molar ratio of citric acid to soluble iron between about 0.5:1 and about 10:1 and preferably to supply a molar ratio between about 1:1 and 5:1. However, in commercial practice, it is often difficult to predict the amount of soluble iron which will be present in the system and, moreover, the amount of soluble iron can be subject to sudden largely unpredictable variations. Thus, it can sometimes be difficult to assess, in advance, the amount of citric acid to be employed to provide a given molar ratio. In such instances, it is generally sufficient to employ amounts of citric acid sufficient to provide between about 50 ppm and about 3,000 ppm by weight of total stream. Practically speaking, however, any amounts of citric acid can be employed but it should be kept in mind that very large excesses of citric acid can result in such an increase in the acidity of hydroperoxide-containing streams, that a point is reached where the acid itself might act as a hydroperoxide decomposition catalyst. For this reason, it is generally desired to avoid the use of amounts of citric acid exceeding 5% (wt. basis) of the total stream, desirably not exceeding 3% (wt. basis) and preferably not exceeding 1% (wt. basis) of the total stream.

Incorporation of the citric acid with the organic hydroperoxide can be effected in a variety of ways. The citric acid can be admixed with the hydrocarbon feed to autoxidation or injected into the liquid phase reaction medium within the autoxidation reactor. It can also be injected into the effluent (also called the "oxidate") from autoxidation. Similarly, if intermediate distillation between autoxidation and epoxidation is employed, for example for the removal of unreacted hydrocarbon, the citric acid can be injected into the feed to the distillation or, with greater advantage, into the reflux to the distillation column. Citric acid can also be added at still later points in the overall process, for example to epxodation feed. Citric acid may be added continuously or periodically since, even with periodic injection, inventories of reactants and products within process equipment will be sufficiently large to provide a sufficient reservoir of citric acid to afford the desired protective action for hydroperoxide.

In the autoxidation, a hydrocarbon oxidized, employing molecular oxygen as the oxidant, to convert at least a portion of the hydrocarbon to the corresponding hydroperoxide. This autoxidation is carried out in the presence of a liquid phase reaction medium. The oxygen can be in the form of air or it can be in the form of a mixture of oxygen with an inert gas (e.g., helium, argon, neon, nitrogen, etc.) the mixture having a greater or lesser proportion of oxygen than is found in air. The autoxidation is normally carried out non-catalytically although initiators (typically, peroxidic compounds) can be added to reduce or eliminate reaction induction time. Autoxidation reaction conditions include temperatures broadly in the range of 40°C to 200°C, desirably within the range of 80°C to 180°C and preferably within the range from 90°C to 150°C. Pressures can be within the range from about atmospheric to about 1,000 psia or even higher. Preferable autoxidation pressures are in the range of 30–150 psia, the only requirement being that pressure be maintained at a level sufficient to maintain at least a portion of the reaction medium within the liquid phase throughout the autoxidation. Autoxidation is usually continued until 1% to about 70%, preferably 10% to 50%, of the hydrocarbon feed is convert to hydroperoxide.

A wide variety of hydrocarbons can be fed to the autoxidation and therein converted to hydroperoxide. Preferred hydrocarbon feeds are those of the following types which have 4 or more carbon atoms per molecule (a) aliphatic hydrocarbons having tertiary carbon atoms, (b) aralkyl hydrocarbons having a secondary or tertiary carbon atom in a position alpha to the aryl nucleus or (c) alicyclic hydrocarbons. It is generally also preferred to use hydrocarbons of the foregoing types which contain 20 or fewer carbon atoms per molecule although this is not essential. Illustrative of preferred aliphatic hydrocarbons (the hydroperoxides selectively formed by their autoxidation being shown in parentheses immediately following the name of the hydrocarbon) include isobutane (t-butyl hydroperoxide), 2-methylbutane (t-amyl hydroperoxide) 2-methylpentane (2-methyl-2-hydroperoxypentane), 3-methylpentane (3-methyl-3-hydroperoxypentane), 2,3-dimethylbutane (2,3-dimethyl-2-hydroperoxybutane), 2,3,4-trimethylpentane (4,4-dimethyl-2-hydroperoxy-2-methylpentane) and the like. Illustrative of preferred aralkyl hydrocarbons and the hydroperoxides formed by their autoxidation are ethylbenzene (alpha-phenylethyl hydroperoxide) cumene (alpha, alphadimethylbenzyl hydroperoxide), tetralin (tetralin hydroperoxide), p-ethyltoluene (p-methyl ethylbenzene hydroperoxide), p-isoproyltoluene (p-methylcumene hydroperoxide), the alkyl substituted naphtahalenes and the like. Illustrative alicyclic hydrocarbons include cyclohexane and its alkyl substituted derivateives such as methyl and ethyl cyclohexane, decalin and its derivatives and the like. Particularly preferred hydrocarbons are isobutane, 2-methylbutane, 2-methylpentane, 3-methylpentane, ethylbenzene, cumene and cyclohexane primarily because of their low cost and ready availability.

The liquid phase reaction medium in which the autoxidation reaction occurs can comprise a solvent which is non-reactive under the reaction conditions employed such as, for example, aromatic hydrocarbons like benzene, toluene, naphthalene and the like or it can comprise the hydrocarbon being oxidized together with the primary reaction products of the autoxidation, namely, the hydroperoxide and the alcohol. The use of polar solvents such as alcohols in which reactants and products are soluble is also possible. When solvents are used, it is preferred to use those which do not interfere with product recovery. Thus, when ethylbenzene is the hydrocarbon to be oxidized, alpha-phenylethanol is a preferred solvent while, when isobutane or 2-methylbutane are the hydrocarbons to be oxidized, preferred solvents are, respectively t-butanol and t-amyl alcohol.

In the epoxidation, the hydroperoxide formed in autoxidation is reacted in the liquid phase with an olefinically unsaturated compound in the presence of a catalyst. The olefinically unsaturated compound is converted to the corresponding epoxide and the hydroperoxide is converted to the corresponding alcohol. The catalysts are one or more metals selected from the group consisting of molybdenum, tungsten, titanium, columbium, tantalum, rhenium, selenium, chromium, zirconium, tellurium, uranium, or vanadium. Of the foregoing, vanadium, tungsten, molybdenum, titanium and selenium are the preferred species. The catalyst metals are preferably supplied to the reaction either in the finally metallic state or in the form of their compounds. Organo-metallic compounds of the above metals in such forms as, for example, naphthenates, stearates, octanoates, chelates, association compounds and enol salts (e.g., as acetoacetonates) as well as in the form of alkoxy compounds are useful. Inorganic forms such as for example, the oxides (e.g., in the case of molybdenum, $Mo_2O_3$, $MoO_2$ and $MoO_3$) acids (e.g., molybdic acid), chlorides, oxychlorides, fluorides, bromides, phosphates, sulfates, heteropolyacids (e.g., phosphomolybdic acid and alkali metal salts thereof) and the like are also useful. Effective amounts of these catalysts desirably are sufficient to provide at least 0.00001 mol of metal per mol of organic hydroperoxide present in the reaction. Amounts of metal as great as 0.1 mol per mol of hydroperoxide or even more can be employed.

Desirable epoxidation reaction conditions include a reaction temperature between about 0°C and about 200°C, desirably between about 90°C and about 200°C and preferably between about 90°C and about 150°C. Reaction pressures employed are sufficient to maintain a liquid phase within the epoxidation reactor. Depending upon the system involved, reaction pressures will therefore be between atmospheric pressure and about 900 psia and are usually between about 200 psia and about 700 psia. The molar ratio of olefin to organic hydroperoxide in the epoxidation is generally between about 1:1 and about 20:1. Reaction times employed are normally between about 10 minutes and about 10 hours.

The olefinically unsaturated materials fed to the epoxidation include substituted and unsubstituted aliphatic and alicyclic olefin hydrocarbons. Preferred compounds are those having from about two to 30 carbon atoms and preferably at least three carbon atoms. Illustrative and preferred olefins are propylene, normal butylene, isobutylene, the pentenes, the methylpentenes, the normal hexenes, the octenes, the dodecenes, cyclohexene, methylcyclohexene, butadiene, styrene, methyl styrene vinyl toluene, vinyl cyclohexenes and the like. Olefins having substituents including ester and ether linkages can be used. Such substituted olefins are illustrated by allyl alcohol, methallyl alcohol, diallyl ether, methyl methacrylate, methyl oleate, methyl vinyl ketone, allyl chloride and the like. Particularly preferred olefins are propylene, n-butene -1,2-methyl pentene, styrene, and butadiene.

The epoxidation reaction is desirably carried out in the presence of a solvent. Suitable solvents are the aliphatic, naphthenic or aromatic hydrocarbons or their oxygenated derivatives. Preferably, the solvent has the same carbon skeleton as the hydroperoxide used so as to minimize or avoid solvent separation problems during product recovery. Solvent mixtures can also be employed and, indeed, commonly are employed. Thus, for example, when ethylbenzene hydroperoxide is used, a particularly preferred solvent would comprise a mixture of ethylbenzene and alphaphenylethanol.

DESCRIPTION OF THE DRAWING

The process and the advantages of this invention will be more fully explained in conjunction with the attached drawing which consists of three figures.

FIG. 1 is a curve illustrating the selectivity-conversion relationships typically observed in autoxidations of hydrocarbons to hydroperoxides. Both curves of FIG. 1 represent statistically smoothed data obtained without steps being taken to free the autoxidation system used of soluble iron contamination. The data are specifically representative of isobutane oxidation at 140°C. The curve labelled A illustrates this invention as the feed to the autoxidations whence this data were derived contains, in each instance, 800 ppm of citric acid. By way of contrast, curve B of FIG. 1 illustrates results when no citric acid is used. The units of the ordinate of FIG. 1 are moles of hydroperoxide formed per mole of oxygen consumed which is indicative of selectivity (i.e., moles of product formed per mole of reactant converted). The units of the abscissa of FIG. 1 are moles of oxygen consumed for a fixed amount of isobutane charged which is indicative of conversion (i.e., moles of reactant consumed per mole of reactant fed). The improvement obtained by conducting autoxidations in accordance with this invention is thus clearly seen since selectivity at moderately low conversion levels typical of commercially practicable operation is substantially two or three times as high as that obtained in the absence of citric acid. As conversion increases, selectivity decreases as would be expected but, even so, use of citric acid still results in improved selectivity.

FIG. 3 is a schematic representation of one preferred embodiment of this invention. For purposes of illustration but without intending any limitation upon the scope of this invention, the process as illustrated is assumed to be conducted in a continuous manner although this invention is not so limited, being readily applicable to batch operation. For simplicity in describing the drawing, the hydrocarbon feed to autoxidation is assumed to be ethylbenzene.

Figure 1:
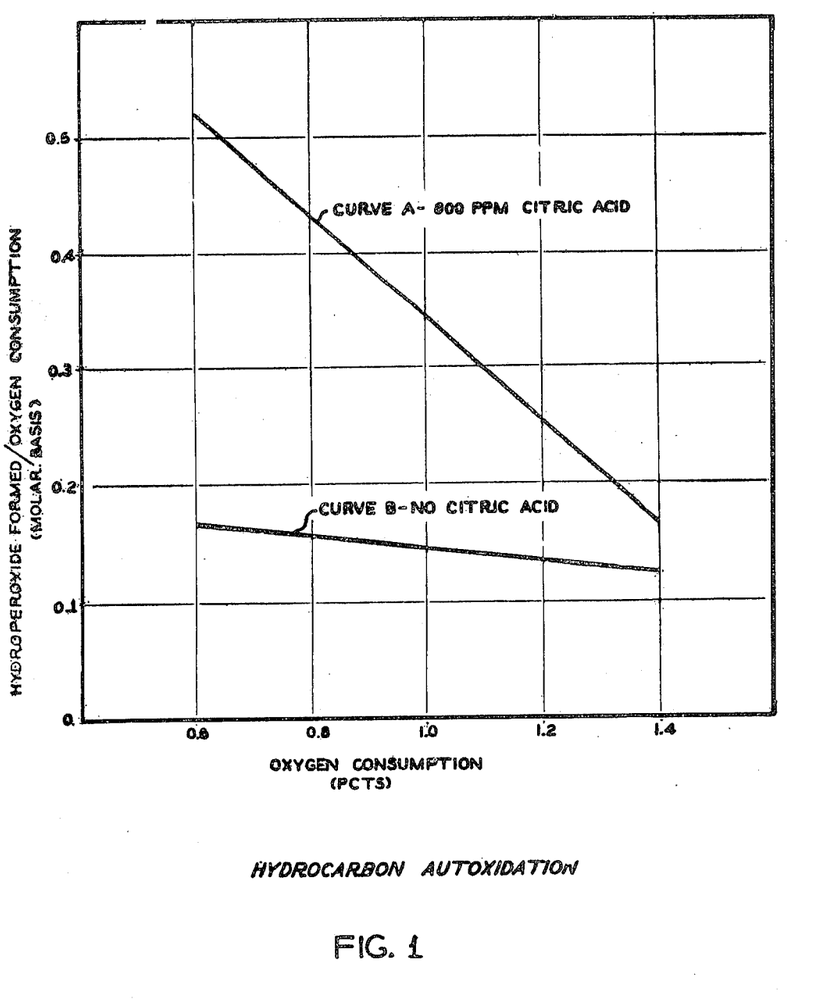
Figure 2:
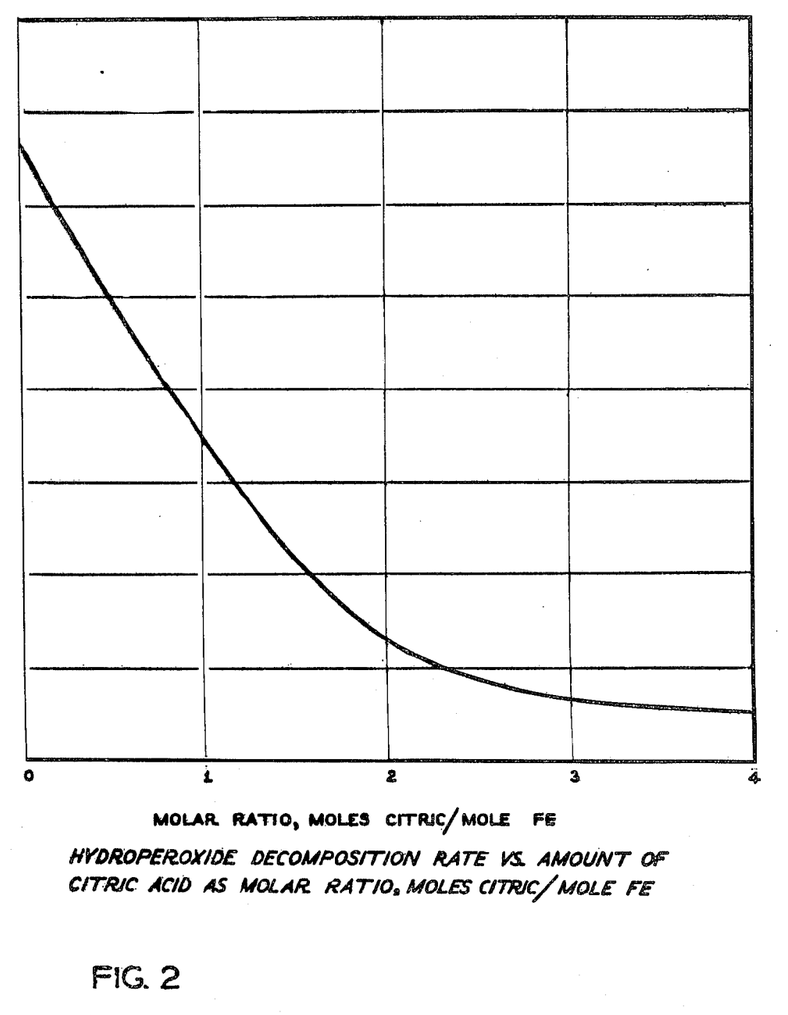
FIG. 2 is a graph illustrating the effect of varying amounts of citric acid on hydroperoxide decomposition rate and is a representation of the results of Example III which is hereinafter described. The units of the ordinate are hydroperoxide decomposition rate in percent per hour while the abscissa's units are moles of citric acid per mole of soluble iron. All data represented in FIG. 2 represent t-butyl hydroperoxide decomposition studies at 90°C and in the presence of 10 ppm of soluble iron.
Figure 3:
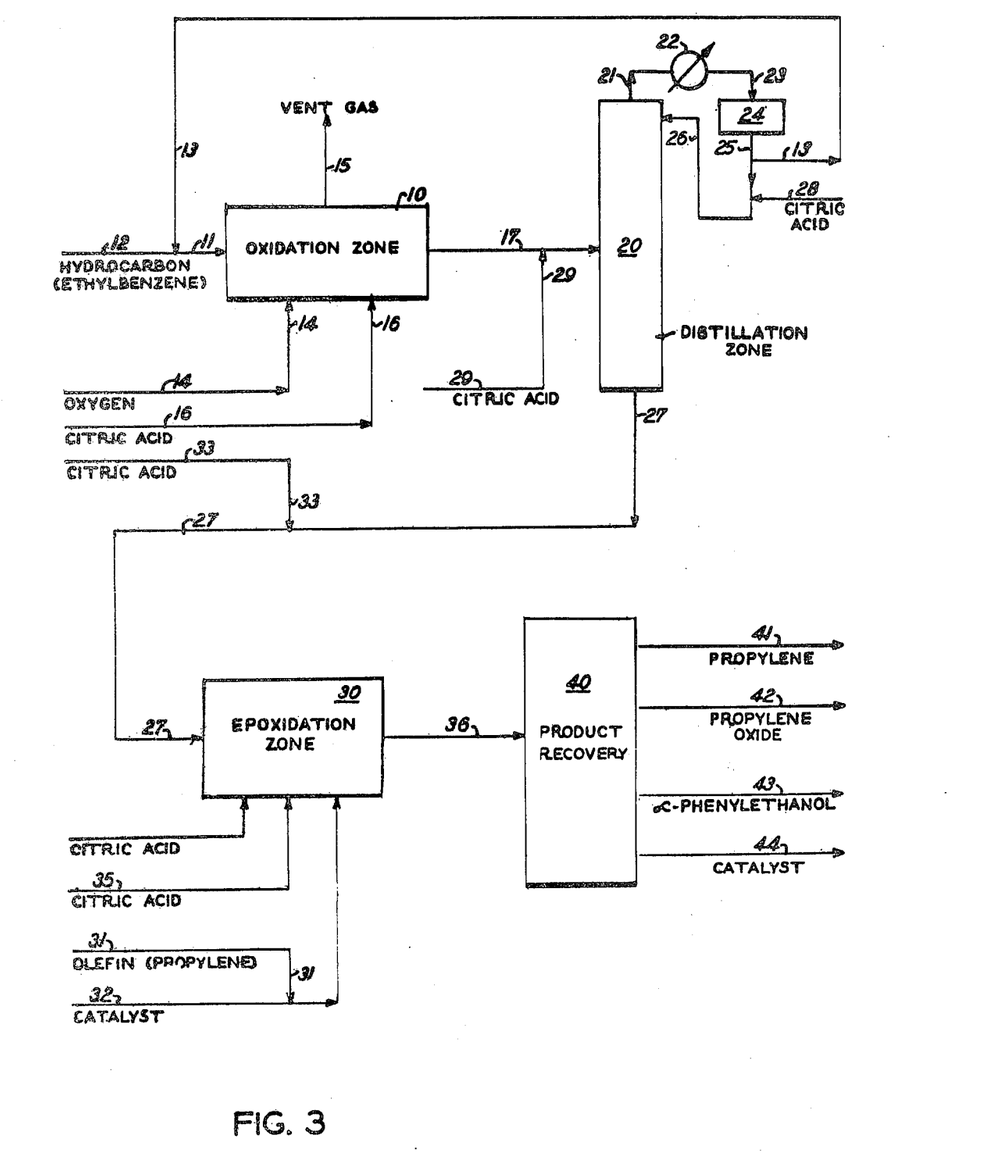

Referring to the accompanying drawing, there is provided an autoxidation reactor 10 having inlet conduit 11. Hydrocarbon feed, suitably ethylbenzene, is supplied to reactor 10 via conduit 11. This hydrocarbon feed is made up of a fresh feed supplied via conduit 12 and a recycle stream, obtained in a manner hereinafter described, supplied via conduit 13, both of which conduits communicate with conduit 11. Where desired, an autoxidation solvent can also be supplied to autoxidation reactant 10 via suitable conduits (not shown). A preferred autoxidation solvent for the embodiment illustrated in FIG. 2 would be alpha-phenylethanol. An oxygen-containing gas suitably in the form of air is supplied to autoxidation reactor 10 via conduit 14. Inert gases and unconsumed oxygen are purged from the reactor via conduit 15 either for discard or for recycle. In accordance with this invention, citric acid is also supplied to the autoxidation reactor 10 via conduit 16 communicating directly with the reactor. Alternatively, the citric acid can be added through suitable conduits (not shown) communicating directly with either conduits 11, 12 or 13 thereby premixing the citric acid with the hydrocarbon feed. The citric acid can be supplied as such or it can be predissolved, suitably in alpha-phenylethanol.

Within oxidation zone 10, the hydrocarbon feed, in this case ethylbenzene, is autoxidized in part to form alpha-phenylethyl hydroperoxide (ethylbenzene hydroperoxide) and alpha-phenylethanol. Small amounts of by-products are also produced such as acids, aldehydes and ketones. The product of the autoxidation is withdrawn from reactor 10 via conduit 17 and fed to distillation zone 20. This effluent, aside from the by-products hereinabove described, predominantly contains unreacted ethylbenzene, ethylbenzene hydroperoxide and alpha-phenylethanol.

Within distillation zone 20, the effluent from the autoxidation is processed to separate part of the unreacted ethylbenzene from the oxidation products. Distillation zone 20 is of conventional type and design containing from about 3 to about 30 theoretical vapor-liquid contacting stages and designed to operate with reflux ratio (moles of liquid reflux per mole of net overhead product) between about 0.13:1 and about 1.0:1. Column pressures are generally maintained between about 50 and about 400 mm Hg. Overhead product, predominantly unreacted ethylbenzene, is withdrawn from distillation zone 20 via conduit 21, and condensed in heat exchanger 22. The condensate then flows through conduit 23 to reflux drum 24. The condesnate is withdrawn from reflux drum 24 via conduit 25 and divided into two portions. The first of these is the net overhead product which passes via conduit 13 back to oxidation zone 10. The balance is returned as reflux to distillation zone 20 via conduit 26. The bottoms from distillation zone 20 is withdrawn via conduit 27 and fed to epoxidation zone 30. In addition to, or as an alternate to, adding citric acid to the autoxidation, citric acid can be introduced through suitable conduits either to the reflux of distillation zone 20 or to the feed to this distillation. These feed points for the citric acid are indicated in FIG. 3 by conduits numbered 28 and 29 respectively. Citric acid addition via conduit 28 is preferred since such addition insures the pesence of at least some citric acid on each plate of the distillation column. Naturally, distillation zone 20 is also equipped with facilities for the supply of heat thereto, for example, by open steam injection or by indirect heat exchange (reboiling) but these facilities, being conventional, are not illustrated.

The oxidate, now concentrated in hydroperoxide by removal of a portion of the unreacted hydrocarbon, is introduced to epoxidation zone 30 via conduit 27. Also fed to epoxidation zone 30 is an olefinically unsaturated compound, typically propylene. This is introduced to epoxidation zone 30 via conduit 31. Epoxidation catalyst, suitably molybdenum (for example, in the form of the naphthenate salt) is introduced into epoxidation zone 30 via conduit 32. Reaction solvent can also be added to epoxidation reactor 30 via suitable conduits, not shown. Within epoxidation zone 30, the olefinically unsaturated compound and the hydroperoxide component of the oxidate react to form an oxirane compound (in this case, propylene oxide) and the hydroperoxide is converted to the corresponding alcohol (in this case alpha-phenylethanol). Since the presence of soluble iron decreases the rate of the epoxidation and also catalyzes undesired hydroperoxide decomposition, citric acid is also advantageous for use within the epoxidation zone. As illustrated in FIG. 3, citric acid is present in the oxidate but, were it not, it could be added by suitable conduits (for example, via conduits 33, 34 or 35) to the epoxidation zone. The epoxidate, comprising unreacted propylene, propylene oxide, alpha-phenylethanol and catalyst as well as small amounts of by-products are withdrawn from epoxidation zone 30 via conduit 36 and introduced to product recovery zone 40.

Within product recovery zone 40 the various components of the epoxidate are separted from each other. Product recovery zone 40 suitably comprises one or a series of distillation columns each of conventional type and design which, being known, are not delineated here. The products obtained within product recovery zone 40 are unreacted propylene (conduit 41) which can be recycled to epoxidation zone 30 through suitable conduits, not shown. Propylene oxide product is withdrawn via conduit 42 for further purification and/or use. Alpha-phenylethanol formed both by autoxidation within oxidation zone 10 and as a by-product of the reaction between propylene and the alpha-phenylethyl hydroperoxide in epoxidation zone 30 and other reaction by-products are withdrawn via conduit 43. A portion of this alpha-phenylethanol can be recycled to oxidation zone 10 for use as a liquid phase reaction medium therewithin and/or the alpha-phenylethanol can be recycled to epoxidation zone 30 for use as a solvent therewithin. A portion of this recycled alcohol can be used as a solvent for the citric acid. Catalyst is also withdrawn from product recovery zone 40 via conduit 44 and can be recycled to the epoxidation zone.

EXAMPLES

The following examples are presented to further illustrate this invention but are not intended as limiting the scope thereof. Unless otherwise stated, parts and percents in these examples are expressed on a weight basis.

EXAMPLE I

The following batch autoxidation runs illustrate the conversion of isobutane to a mixture comprising t-butyl hydroperoxide and t-butanol. These runs are carried out in a stainless steel (type 316) autoclave, the same autoclave being used for all runs. This autoclave had been previously used for other hydrocarbon autoxidations with no attempt at cleaning or passivating the reactor prior to the runs of this Example. Reaction conditions are: temperature = 140°C, pressure = 650 psig, duration = 4 hours. The amount of isobutane charged in each of the runs (300 grams) is the same. Air, fed continuously to the reactors during the course of the autoxidations, is used as the source of molecular oxygen and the air flow rate is periodically adjusted to give an approximate concentration of oxygen in the vent gases of about 10%. The results obtained are presented in TABLE I below. The lettered runs (A–G inclusive) are controls wherein no citric acid is employed. The numbered runs (1–9 inclusive) are conducted in accordance with this invention. In Runs 1–8, the isobutane feed to the autoclave contains 800 ppm (by weight) of citric acid. In Runs 9, isobutane feed contains 200 ppm of citric acid.

In TABLE I, TBHP is an abbreviation for t-butyl hydroperoxide and Na PP is an abbreviation for sodium pyrophosphate, a known scavenger for metal ions. Hydroperoxide yields are given in Column 2 of the table. Acid make in autoxidation (column 3 of TABLE I) is expressed in milliequivalents of acid per gram of debutanized effluent and is a measure of the quantity of by-products formed. The higher the acid make, the poorer is the quality of the oxidate produced. Acid make values for runs 1–9 are corrected to allow for approximately 0.05 meq./gm. of acidity contributed by the citric acid in Runs 1–8 and by about 0.01 meq./gm. in Run 9.

The data presented in TABLE I strikingly illustrate the advantages accruing from the use of the process of this invention. The arithmetic average yield of t-butyl hydroperoxide in Runs A–C is only about 0.09 moles. Pyrophosphate treatment of the reaction improves yield to an average of about 0.19 moles despite the presence of iron. However, citric acid improves yield to about 0.32 moles — an almost twofold improvement. This is so even in the presence of unpassivated stainless steel (run 6) or n the presence of iron oxide, representative of rust or scale within the reactors (Runs 7 and 8). The presence of such materials has no effect on yield when sufficient citric acid is used. Note also the improvement in uniformity of results when citric acid is used.

EXAMPLE II

To ascertain the effect of citric acid upon hydroperoxide decomposition under conditions like those encountered in processing between autoxidation and epoxidation, samples of the oxidates are distilled under vacuum for the removal of unreacted isobutane. The debutanized samples are then held at 90°C for 2 hours at the end of which time the amount of hydroperoxide lost by decomposition is determined. Solid citric acid in an amount sufficient to supply 800 ppm by weight in the sample is then added to those materials not already containing citric acid and is allowed to dissolve. The sample is then held at 90°C for an additional 2 hours and additional hydroperoxide bss is ascertained. Results are given in TABLE II which follows:

TABLE I

| (1) Run No. | (2) TBHP Yield (moles) | (3) Effluent Composition Acid Content (meq./gm.) | (4) Remarks |
|---|---|---|---|
| A | 0.11 | 0.47 | |
| B | 0.18 | 0.31 | |
| C | 0.08 | 0.38 | |
| Average | 0.09 | 0.39 | |
| D | 0.20 | — | Reactor washed with Na PP before run. |
| E | 0.08 | 0.13 | Fe₂O₃ present in autoclave |
| F | 0.17 | 0.27 | Fe₂O₃ present in autoclave |
| G | 0.29 | 0.23 | Reactor again washed with Na PP |
| Average | 0.19 | 0.21 | |
| 1 | 0.36 | 0.08 | |
| 2 | 0.30 | 0.18 | |
| 3 | 0.33 | 0.19 | |
| 4 | 0.29 | — | |
| 5 | 0.32 | 0.11 | |
| Average | 0.32 | 0.14 | |
| 6 | 0.33 | 0.07 | Stainless steel powder added |
| 7 | 0.32 | 0.08 | Fe₂O₃ added to autoclave |
| 8 | 0.32 | 0.17 | Fe₂O₃ added to autoclave |
| Average | 0.32 | 0.11 | |
| 9 | 0.30 | 0.06 | |

TABLE II

| Run | Source (1) | Hydroperoxide Decomposition, %hr. | |
|---|---|---|---|
| | | Before citric acid addition | After citric acid addition |
| 1 | B | 1.7 | nil |
| 2 | C | 0.8 | nil |
| 3 | D | 2.7 | 0.8 |
| 4 | E | 0.6 | 0.2 |
| 5 | F | 3.2 | nil |
| 6 | 6 | nil | no additional citric acid used |
| 7 | 7 | nil | " |

(1) References are to run numbers of Example I.

The effect of the citric acid in reducing or even eliminating iron-catalyzed hydroperoxide decomposition is thus clearly shown.

EXAMPLE III

Since Example II employed a constant amount of citric acid in oxidates having various levels of iron contamination, the runs of this Example are carried out with varying amounts of citric acid but a constant iron content.

To a sample of a debutanized oxidate containing 53 wt. % of t-butyl hydroperoxide and approximately 47 wt. % of t-butanol (small amounts of oxidation by-products are also present) is added a sufficient amount of a soluble iron salt to provide 10 ppm of iron in solution. Varying amounts of citric acid are then added to portions of this oxidate. The samples are held at 90°C and hydroperoxide concentration is measured from which rate of loss of hydroperoxide is calculated. Results are presented in TABLE III below and are graphically shown in the annexed FIG. 2.

TABLE III

| Run No. | Amount of Citric Acid, ppm. | Moles Citric Acid / Mole Fe in Sol'n. | Hydroperoxide Decomposition Rate, %/Hr. |
|---|---|---|---|
| 1 | 0 | 0 | 32.6 |
| 2 | 38 | 1 | 17.7 |
| 3 | 75 | 2 | 5.5 |
| 4 | 150 | 4 | 3.0 |

EXAMPLE IV

The effect of citric acid on epoxidation is shown by the following: Propylene is reacted with oxidates containing t-butyl hydroperoxide and t-butanol in the presence of a molybdenum catalyst. The oxidates are prepared in a manner similar to that outlined above in Example I and have the composition hereinafter indicated. The molybdenum catalyst is prepared by refluxing a portion of the oxidate, excess finely divided molybdenum powder and propylene glycol for about 4 hours at atmospheric pressure. The resultant slurry is filtered and the filtrate, containing 3,600 ppm of molybdenum in solution, is used as catalyst. All runs of this Example are carried out at 132°C for 1 hour at autogenous pressure employing a charge containing propylene and t-butyl hydroperoxide in a molar ration of 4:1. The oxidate charge contains about 38% (wt.) of hydroperoxide. The charge to the numbered runs also contains 1600 ppm of citric acid. No citric acid is used in the control. The results are reported in TABLE IV which follows. Conversions and selectivities reported in the table are based on hydroperoxide.

TABLE IV

| Run No. | Conversion to propylene oxide | Selectivity to propylene oxide |
|---|---|---|
| 1 | 98.7% | 90.3% |
| 2 | 98.1% | 84.5% |
| control | 98.3% | 77.8% |

The foregoing data illustrate that the presence of citric acid, at the least, exerts no adverse effect upon epoxidation and, indeed, may well be beneficial.

EXAMPLE V

The procedure of Example I is repeated except that instead of isobutane, the following hydrocarbons are charged to the autoxidations.
a. 2-methylbutane
b. 2-methylpentane
c. 3-methylpentane
d. 2-3 dimethylbutane
e. 2,2,4-trimethyl pentane (isooctane)
f. ethylbenzene
g. cumene
h. tetralin
i. p-ethyltoluene
j. p-isopropyltoluene
k. 2-ethyl naphtahlene
l. cyclohexane
m. ethyl cyclohexane
n. decalin In each case, the improvements noted from the use of citric acid are substantially similar to those noted in Example I.

EXAMPLE V

Hydroperoxide decomposition rates are measured for each of the oxidates prepared in Example IV using the procedure outlined in Example II. In each case, reductions in hydroperoxide decomposition rate are substantially similar to those runs of Example II when citric acid is employed.

EXAMPLE VII

The procedure of Example III is repeated except that, instead of molybdenum catalyst, the following catalysts are employed. In each case, the catalysts are employed in the form of their naphthanate salts: tungsten, titanium, tantalum, selenium, columbium and rhenium. In each case, substantially no adverse effect on epoxidation is observed because of the presence of citric acid.

EXAMPLE VIII

The procedure of Example III is repeated for the epoxidation of propylene employing the oxidates of Example IV. In each case, substantially, similar results are obtained.

EXAMPLE IX

The procedure of Example IV is repeated for epoxidation of the following olefins employing an oxidate comprising t-amyl hydroperoxide which oxidate is prepared in accordance with the procedure of Example I in the presence of 800 ppm of citric acid.
a. propylene
b. n-butane-1
c. n-butane-2
d. 2-methylbutane-1
e. 2-methylbutane-2
f. butadiene
g. styrene
h. cyclohexene In each case, no adverse effect on the epoxidation is noted because of the presence of citric acid in the epoxidation.

EXAMPLE X

The procedure of Example I is repeated employing varying amounts of citric acid, as follows:
a. 50 ppm
b. 100 ppm
c. 500 ppm
d. 2000 ppm
e. 10,000 ppm In each case, expect for the amount of acidity in the oxidate because of the varying amount of citric acid used, results obtained are substantially similar to those obtained in Example I.

EXAMPLE XI

The oxidates of Example IX are tested for hydroperoxide decomposition rate employing the procedure of Example II. In each case, substantially similar results are obtained.

The foregoing describes the methods of this invention whereby the advantages thereof are obtained. It will be understood that modifications and variations thereof may be effected by those skilled in the art without departing from the spirit of this invention. Accordingly, it is intended that all matter contained in the foregoing description shall be interpreted as illustrative and not in a limiting sense.

I claim:
1. The process for the preparation of an oxirane compound by a process comprising the steps of:
   a. molecular oxygen oxidation of a hydrocarbon in the presence of a liquid phase reaction medium to produce an organic hydroperoxide corresponding in carbon structure to the hydrocarbon starting material;
   b. incorporating citric acid with the said organic hydroperoxide in amount sufficient to suppress iron-catalyzed hydroperoxide decomposition without adversely affecting the subsequent reaction between the hydroperoxide and the olefinic compound; and
   c. reacting the said organic hydroperoxide containing said citric acid with an olefinically unsaturated compound in the liquid phase in the presence of an epoxidation catalyst.

2. A process in accordance with claim 1 wherein the hydrocarbon has at least four carbon atoms per molecule and is selected from the group consisting of aliphatics having tertiary carbon atoms, aralkyls having a secondary or tertiary carbon atom in a position alpha to the aryl nucleus and alicyclics.

3. A process in accordance with claim 1 wherein the olefinically unsaturated compound is selected from the group consisting of propylene, n-butylene isobutylene, the methyl pentenes, butadiene and styrene.

4. A process in accordance with claim 2 wherein the hydrocarbon is selected from the group consisting of isobutane, 2-methylbutane, 2-methylpentane, 3-methylpentane, ethylbenzene, cumene and cyclohexane.

5. A process in accordance with claim 1 wherein the molar ratio of citric acid to soluble iron is at least about 0.2:1.

6. A process in accordance with claim 1 wherein the citric acid is present as a component of the liquid phase reaction medium employed in the molecular oxygen oxidation.

7. A process in accordance with claim 1 comprising the additional step of distilling unreacted hydrocarbon from the product of the molecular oxygen oxidation.

8. A process in accordance with claim 7 wherein citric acid is added to the product of the molecular oxygen oxidation subsequent to the oxidation but prior to the distillation.

9. A process in accordance with claim 1 wherein the oxirane compound is propylene oxide, the hydrocarbon is isobutane, the organic hydroperoxide is t-butyl hydroperoxide and the olefinically unsaturated compound is propylene.

10. A process in accordance with claim 1 wherein the hydrocarbon is ethylbenzene and the organic hydroperoxide is alpha-phenylethyl hydroperoxide.

* * * * *